J. P. MacLEAN.
MEANS FOR ABSORBING THE SHOCK ON THE SADDLES OF MOTOR AND OTHER VEHICLES.
APPLICATION FILED OCT. 1, 1918.

1,333,125.

Patented Mar. 9, 1920.

Inventor
John Percy MacLean
By Wm Wallace White
ATT'Y.

UNITED STATES PATENT OFFICE.

JOHN PERCY MacLEAN, OF HAMILTON, NEW SOUTH WALES, AUSTRALIA.

MEANS FOR ABSORBING THE SHOCK ON THE SADDLES OF MOTOR AND OTHER VEHICLES.

1,333,125.     Specification of Letters Patent.     Patented Mar. 9, 1920.

Application filed October 1, 1918. Serial No. 256,395.

*To all whom it may concern:*

Be it known that I, JOHN PERCY MAC-LEAN, a subject of the King of Great Britain and Ireland, residing at Veda street, Hamilton, State of New South Wales, Commonwealth of Australia, have invented new and useful Improvements in Improved Means for Absorbing the Shock on the Saddles of Motor and Other Vehicles, of which the following is a specification.

In this invention, the frame bars of an ordinary cycle saddle are extended rearward, and instead of being clamped to a seat post at or about the center, as is the usual practice, the fore ends of the frame bars are articulated to a link carried by the cycle frame, the rear ends of the extended bars being supported by springs carried by any suitable part of the back of the frame of the cycle. Attached to the extended saddle bars is a brace or stay to which one end of a compound or double action horizontal spring is attached, the other end of the spring being secured to a stud projecting from the down stay of the frame of the cycle.

But in order that the invention may be properly understood, reference will be made to the accompanying sheet of drawings in which:—

Figure 1:
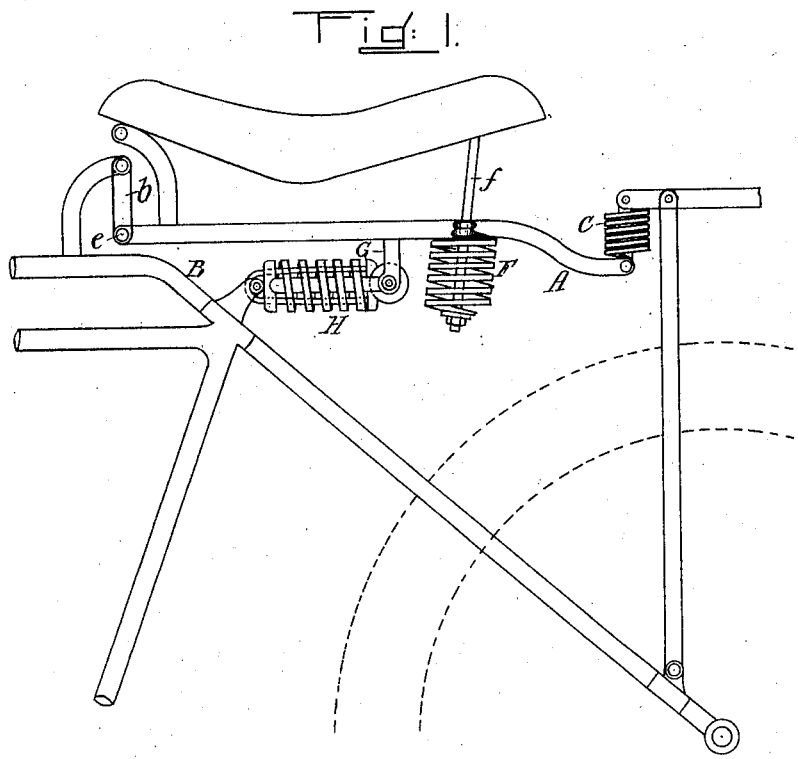
Figure 1 is a side elevation of the appliances adopted.
Figure 2:
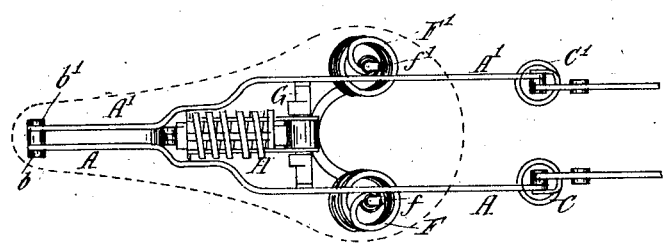
Fig. 2 is a plan of the same, the saddle being removed.

The saddle frame bars, somewhat resembling a fork, are shown at A, A', the forward end of each part being articulated to the lower ends of links b, b', that are articulated to a bracket attached to the top stay of the cycle frame B; the extended rear ends of the saddle frame bars A, A', are articulated to and suspended from the springs C, C', in tension, that are articulated to and carried by the luggage carrier over the rear wheel of the cycle. A fork rising from, at, or about the rear stays of the frame of the cycle would answer the same purpose. The springs C, C', are articulated at each end so as to allow the frame bars A, A', to move in a horizontal plane controlled by the horizontal spring H. The front part of the saddle frame bar is articulated at e to the links b, b', to the rear part of the saddle being carried by springs F, F', in tension, through the media of the rods f, f'. The springs F, F', are supported by the saddle frame bars A, A'. The extended saddle frame bars A, A', are connected together near their centers by a brace G mediate between the springs F, F', the brace G is provided with a stud, and at or about the down stay of the main frame B is another stud; between the two studs is mounted a horizontal spring H to absorb horizontal shock. The auxiliary springs C, C', will absorb any excessive vertical shock.

I claim:—

1. In shock absorbers for cycles, frame bars, fore and aft linked connections suspending said bars from parts of a cycle, resilient means associated with said aft linked connection, a supported member pivoted near one end to said frame bars, and spring supporting means disposed between the other end of said supported member and the frame bars.

2. In shock absorbers for cycles, frame bars, fore and aft linked connections suspending said bars from parts of a cycle, resilient means associated with said aft linked connection, a supported member pivoted near one end to said frame bars, spring supporting means disposed between the other end of said supported member and the frame bars, and a double acting horizontally disposed spring located between parts of said cycle and frame bars.

3. In shock absorbers for motor and other cycles, in combination, extended saddle frame bars, each bar being articulated in front to a link carried by the frame of the cycle, and supported at the rear extensions by auxiliary springs that are carried by suitable means projecting upward from the rear part of the cycle, a saddle articulated at or near the forward ends of the saddle frame bars and springs carried by the saddle frame bars for supporting the rear of the saddle as and for the purposes specified.

4. In shock absorbers for motor and other cycles, in combination, extended saddle frame bars, each bar being articulated in front to a link carried by the frame of the cycle, and supported at the rear extensions by auxiliary springs that are carried by suitable means projecting upward from the rear part of the cycle, a saddle articulated near the forward ends of the saddle frame bars and supported at the rear on springs carried by the extended saddle frame bars, a brace between the saddle frame bars and a horizontal spring mediate between the brace and the main frame of the cycle, as and for the purposes herein set forth.

In testimony whereof I have signed my name to this specification in the presence of two subscribing witnesses.

JOHN PERCY MacLEAN.

Witnesses:
J. T. MASSEY,
ELI TAYLOR.